UNITED STATES PATENT OFFICE.

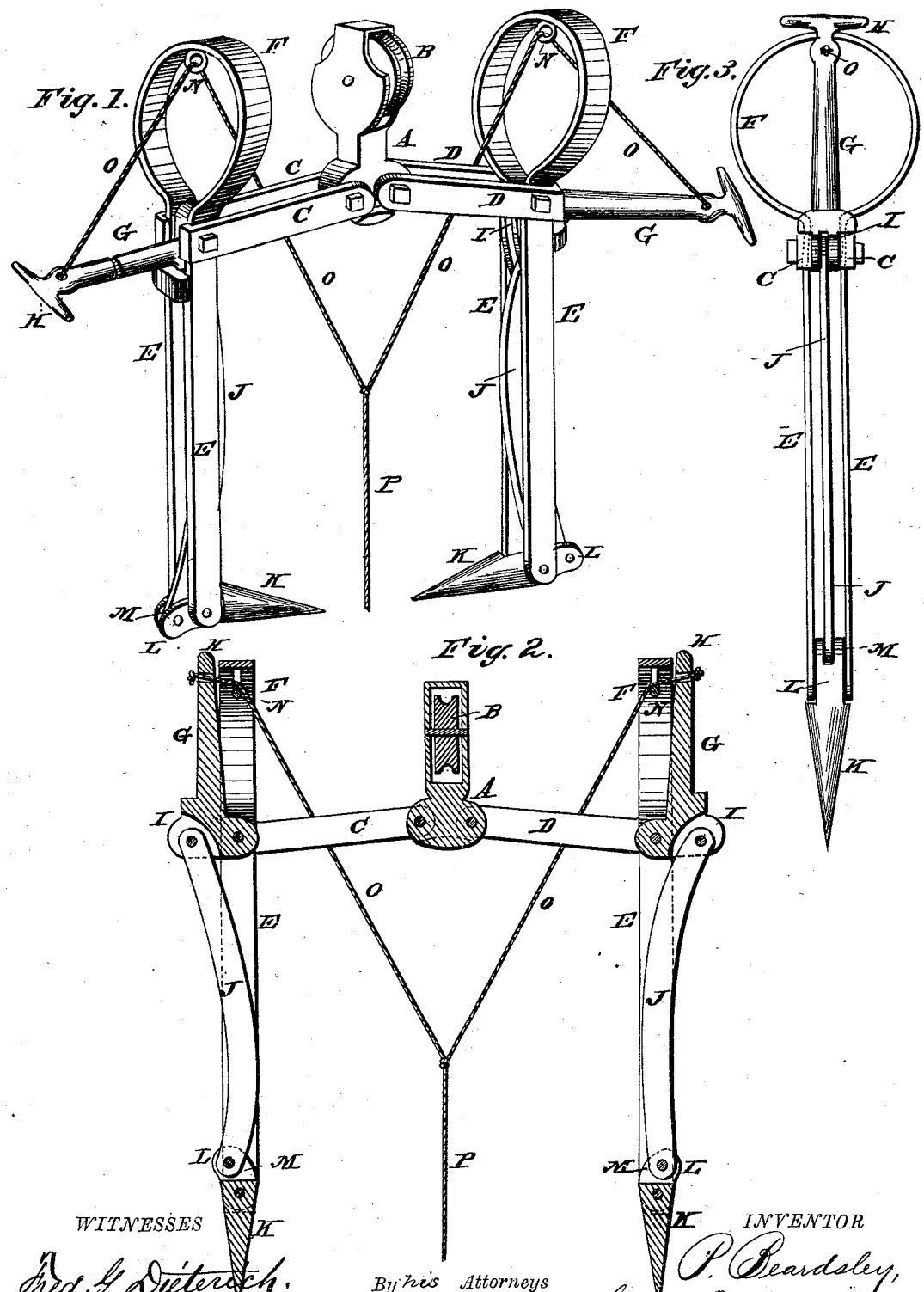

PHILO BEARDSLEY, OF ODESSA, NEW YORK.

HORSE HAY-FORK.

SPECIFICATION forming part of Letters Patent No. 243,682, dated July 5, 1881.

Application filed May 21, 1881. (Model.)

*To all whom it may concern:*

Be it known that I, PHILO BEARDSLEY, of Odessa, in the county of Schuyler and State of New York, have invented certain new and useful Improvements in Horse Hay-Forks, which I denominate the "Common-Sense Horse Hay and Grain Fork;" and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved hay-fork. Fig. 2 is a vertical sectional view, and Fig. 3 is a side view.

Corresponding parts in the several figures are denoted by like letters of reference.

This invention relates to horse hay or grain forks; and it consists in certain improvements in the construction of the same, which will be hereinafter fully described, and particularly pointed out in the claims.

In the drawings hereto annexed, A represents the head-block, having a pulley, B, for the main hoisting-rope, which is not shown in the drawings.

To the sides of the block A are pivoted two pairs of connecting-rods, C C D D, between the outer ends of which the tines E E are pivoted, as shown. Said tines consist of forked or bifurcated rods, at the upper ends of which, above the connecting-rods, loops or handles F F are formed. In practice I deem it convenient to form each tine by bending a single strip of metal into the proper shape, which is very clearly shown in Fig. 3 of the drawings.

Upon the same bolts by which the tines are pivoted between the connecting-rods, and in the slots of said tines, are pivoted crank-levers G G, the upper ends of which are provided with cross-pieces or thumb-pieces H H, enabling them to be conveniently manipulated.

The outward-projecting arms of the crank-levers G are slotted, as shown at I, and in the slots I are pivoted connecting-rods J, extending downward through the slots, or between the sides of the tines E. Between the lower ends of the latter are pivoted the points or prongs K, having upward-projecting shanks L, slotted at M, to receive the lower ends of the connecting-rods J, which are pivoted, as shown, to the said shanks.

The upper ends of the loops or handles F are provided with downward-projecting eyes N, forming guides for the trip cords or ropes O, which are attached to the crank-levers G near the upper ends of the latter. The inner ends of the trip-ropes are, for convenience, connected, as shown, and terminate in a single rope, P, by which they are operated.

In operation, the parts of the device are first so adjusted as to bring the tines in a parallel vertical position, with the prongs pointing down, as shown in Fig. 2 of the drawings. It may thus be readily forced or driven into the hay or grain, when, by means of the thumb-pieces H, the upper ends of the crank-levers are forced outward, thus, through the connecting-rods J, turning the points or prongs K inward to the position shown in Fig. 1, thus clutching and retaining a "lift" of hay or grain. When draft is applied to the main hoisting-rope the lower ends of the tines are now drawn together, as in Fig. 1, thus clamping the load and enabling it to be hoisted and carried to the required position. By pulling upon the trip-rope the upper arms of the crank-levers G are now drawn to a vertical position, thus bringing the points or prongs K in a line with the tines, and spreading the latter so as to release and drop the load.

By this invention the load is held very securely while hoisted by the tines and prongs. The construction is such that the operator need not release his hold upon the handles until the fork is "set" in the load. The points or prongs turning inward toward each other will pick up the hay or grain clear from the floor or rack, and the entire construction is simple, durable, and inexpensive.

Having thus described my invention, I claim and desire to secure by Letters Patent of the United States—

1. As an improvement in horse hay-forks, the combination of the head A, pivoted connecting-rods C C D D, pivoted slotted or bifurcated tines E E, having pivoted points or prongs K K, with mechanism for operating the latter, as herein described, for the purpose set forth.

2. As an improvement in horse hay-forks, the combination, with the bifurcated tines, connected by pivoted rods to a common head, A, of the crank-levers G, connecting-rods J, and pivoted prongs K, having shanks L, all arranged and operating, as herein shown and specified.

3. The combination of the head-block A, connecting-rods C C D D, pivoted bifurcated tines E, having loops or handles F, provided with the downward-projecting eyes N, crank-levers G, connecting-rods J, pivoted prongs K, having shanks L and the trip-ropes O, all arranged to operate substantially as and for the purpose set forth.

In testimony that I claim the foregoing as my own, I have hereto affixed my signature in presence of two witnesses.

PHILO BEARDSLEY.

Witnesses:
BURR MITCHELL,
G. G. MONTGOMERY.